United States Patent [19]

Langley

[11] Patent Number: 5,245,884
[45] Date of Patent: Sep. 21, 1993

[54] BALL SCREW MECHANISM

[75] Inventor: Neil Langley, Nottingham, England

[73] Assignee: British Aerospace Public Limited Company, London, England

[21] Appl. No.: 5,189

[22] Filed: Jan. 14, 1993

Related U.S. Application Data

[63] Continuation of Ser. No. 577,652, Sep. 5, 1990, abandoned.

[30] Foreign Application Priority Data

Sep. 5, 1989 [GB] United Kingdom ................. 8919990

[51] Int. Cl.⁵ ............................................. F16H 1/18
[52] U.S. Cl. .................................. 74/424.8 R; 74/459
[58] Field of Search ........ 74/89.15, 424.8 R, 424.8 B, 74/459

[56] References Cited

U.S. PATENT DOCUMENTS

| 3,640,147 | 2/1972 | Fantoni | 74/424.8 R |
| 3,648,535 | 3/1972 | Maroth | 74/424.8 R |
| 3,730,016 | 5/1973 | Miller | 74/424.8 B |
| 3,924,486 | 12/1975 | Taillardat | 74/424.8 R X |
| 4,052,906 | 10/1977 | Genini | 74/89.15 X |
| 4,070,921 | 1/1978 | Arnold | 74/459 |
| 4,286,793 | 9/1981 | Ploss et al. | 74/459 X |
| 4,467,671 | 8/1984 | Miyata et al. | 74/424.8 A X |
| 4,604,911 | 8/1986 | Teramachi | 74/459 X |
| 4,612,817 | 9/1986 | Neff | 74/459 X |
| 4,680,982 | 7/1987 | Wilke et al. | 74/424.8 R |
| 4,887,480 | 12/1989 | Pollo | 74/459 |

FOREIGN PATENT DOCUMENTS

| 60-231063 | 11/1985 | Japan . |
| 1330383 | 8/1987 | U.S.S.R. . |
| 1378048 | 12/1974 | United Kingdom . |
| 1542613 | 3/1979 | United Kingdom . |
| 1559899 | 1/1980 | United Kingdom . |

*Primary Examiner*—Allan D. Herrmann
*Assistant Examiner*—David W. Laub
*Attorney, Agent, or Firm*—Cushman, Darby & Cushman

[57] ABSTRACT

A ball-screw includes a shaft 1 having two separate helical grooves 3,4 of the same pitch and spaced by half that pitch. The nut 2 includes two corresponding grooves and return bores 5 to define two endless recirculating paths for balls disposed between the nut and shaft. This arrangement permits, for a given groove pitch, the minimum length of the nut to be reduced.

6 Claims, 2 Drawing Sheets

BALL SCREW MECHANISM

This is a continuation of application Ser. No. 07/577,652, filed on Sep. 5, 1990, which was abandoned upon the filing hereof.

BACKGROUND OF THE INVENTION

This invention relates to a ball-screw mechanism and assembly.

In a conventional ball-screw assembly, a nut body is mounted on a shaft, the shaft having a continuous helical groove on its surface, and the inner surface of the nut having a corresponding groove. Between the nut and shaft are disposed a number of balls that recirculate in an endless path defined by the grooves and a ball transfer bore provided in the nut. Such a known conventional ball-screw assembly is used in many applications to convert linear motion to rotary, and vice versa.

In such a conventional assembly, for the nut to be adequately supported by the balls, the axial length of the recirculating ball path must extend for at least two turns of the helical groove. Thus the minimum length of the nut is dependant on the pitch of the groove. However the length of the nut cannot simply be reduced at will by reducing the pitch of the groove; once the pitch is reduced, the angle that the groove makes to the axis of the shaft is increased, and this increases the frictional resistance to the relative rotation of the nut and shaft.

For many applications this problem is not important since the size of the nut is not critical. In other applications, however, where the size and weight of the nut are important factors, the difficulty of providing a small nut that will still run smoothly on the shaft has proven to be disadvantageous.

SUMMARY OF THE INVENTION

According to the present invention, a ball-screw assembly comprised of a shaft, a nut mounted on said shaft for relative rotation, and a plurality of balls disposed between said nut and shaft, wherein said shaft is provided with two separate helical grooves. The nuts has means for defining, in co-operation with said grooves, two endless recirculating paths for said balls.

By means of this arrangement, it is possible to reduce the length of the ball nut, without increasing the frictional resistance in comparison with a conventional assembly having a single groove.

In a preferred embodiment, the grooves on the shaft have the same pitch. It is particularly preferred that the grooves be spaced by a distance of half their pitch, such that a point on one turn of one groove lies half-way between the corresponding points of adjacent turns of the other groove.

Preferably each recirculating ball path is defined in whole or in part by a helical groove on the interior of said nut and a non-loaded return bore. The two respective return bores are disposed on opposite sides of the nut. If necessary, a transfer member may be provided with each return bore to ensure reliable transfer of balls from the loaded ball grooves of the shaft and nut to the non-loaded return bores.

BRIEF DESCRIPTION OF THE DRAWINGS

An embodiment of the invention will now be described by way of example and with reference to the accompanying drawings; in which.

DESCRIPTION OF THE PREFERRED EMBODIMENTS

Figure 1:
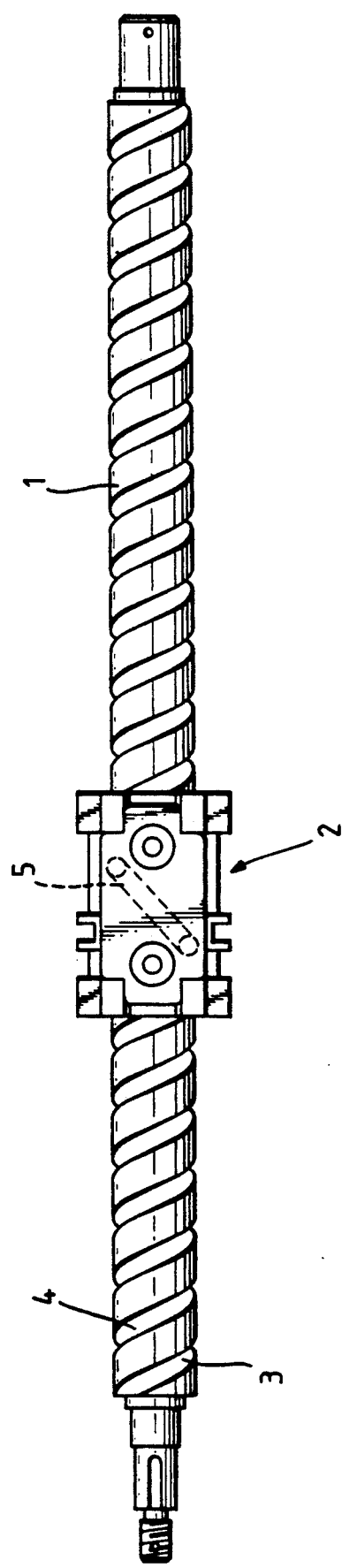
FIG. 1 shows a ball-screw assembly according to an embodiment of the invention, and FIG. 2 (a) and (b), 3 (a) and (b) and 4 show individual components of the assembly of FIG. 1.

Referring to FIG. 1, a ball-screw assembly is shown including an elongated linear shaft 1 and a ball nut 2. The surface of the shaft 1 is provided with two separate helical grooves 3,4 which extend for substantially the entire length of the shaft. Both grooves 3,4 have the same pitch, e.g. 20 mm, and are positioned out of phase with each other, as it were, by approximately 180° so that the two grooves are spaced by half their pitch, i.e. 10. mm. In this way, a point on one turn of one groove lies half-way between the corresponding points of an adjacent turn of the other groove.

The nut 2 surrounds the shaft 1 and has on its inner surface grooves (not shown) corresponding to the grooves 3,4 on the shaft 1. The ends of the grooves on the interior of the nut 2 are connected by respective return bores 5 formed in the nut 2, of which only one is shown in FIG. 1, the other being on the opposite side of the nut 2.

Thus the grooves formed on the shaft and nut define, with the return bores, a pair of endless recirculating paths for a plurality of balls that are disposed between the nut 2 and shaft 1 in the grooves 3,4. The balls in the grooves 3,4 bear the load of the nut 2, while those in the return bores 5 are in a non-loaded state.

The balls allow relative rotation between the nut and shaft just as in a conventional ball nut. In particular, if the shaft 1 is held linearly fixed but free to rotate, linear movement of the nut 2 along the shaft 1 will cause the shaft to rotate. Similarly, if the nut 2 is held linearly fixed, linear movement of the shaft will cause the nut to rotate. Such conversion of linear to rotary motion, or vice versa, may have a number of applications in various technical fields.

Returning to a consideration of the grooves 3,4, the provision of a second groove on the shaft 1 enables a shorter length of the shaft to provide adequate load bearing properties than would a conventional shaft having a single groove of the same pitch, e.g. 20 mm. Thus, the nut 2 can be adequately supported with the axial length of the endless ball paths, i.e. the length in the direction of the shaft 1, being only approximately that of one turn of one groove, i.e. 20 mm, or even slightly less. This is preferable over the two turns that would have been required in the prior art. However, with the present invention the pitch of an individual groove remains only 20 mm, and thus the frictional resistance created is not significantly increased over a known ball-screw having a shaft with a single groove of the same pitch.

Effectively in terms of its load bearing capacity, a double groove shaft, with a corresponding nut, is equivalent to a single groove shaft of half the pitch. Furthermore, the resistance remains only that of a single groove shaft of the same pitch.

Figure 2A:
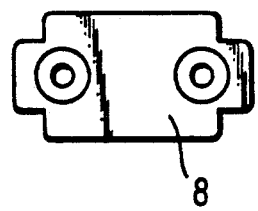
Figure 2B:
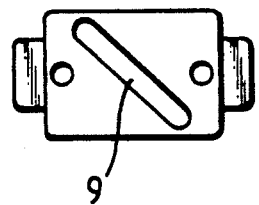
Figure 3A:
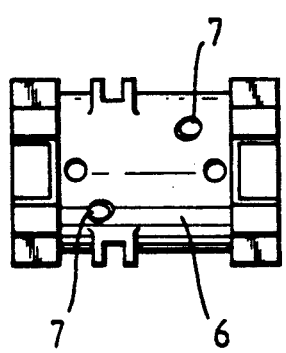
Figure 3B:
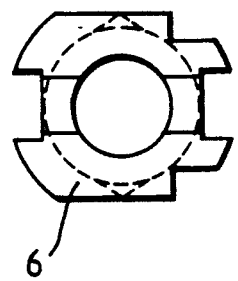
Figure 4:
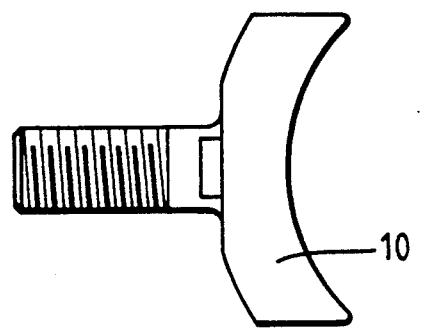

FIGS. 2 to 4 illustrate individual components of the ball nut 2 of FIG. 1. The ball nut 2 comprises a nut body 6 shown in side and end view in FIG. 3 (a) and (b) respectively. The nut body 6 includes a pair of openings 7 on each side formed at the ends of an internal groove, not shown. Secured to the sides of the nut body 6 are a pair of transfer caps 8, of which one is shown in external and internal side views respectively in FIGS. 2 (a) and (b). The inside of each transfer cap 8 has a return groove 9 that links opening 7 when the cap is secured to the body so as to form the return bore 5 (FIG. 1).

To aid in the transfer of balls into the return bore 5, typically a double transfer finger 10 is provided (FIG. 4) The scale of FIG. 4 is enlarged compared to FIGS. 1 to 3.

Although the above description refers to a ball-screw having a two start groove, the number of grooves according to the present invention may be increased further; for example providing three grooves on the shaft and three corresponding grooves on the inside of the nut to define three recirculating paths.

We claim:

1. A ball-screw assembly comprising:
   a shaft having first and second helical grooves;
   a nut body mounted in surrounding relation to said shaft so as to be rotatable relative thereto, said nut body having first and second helical grooves which cooperate respectively with said first and second helical grooves of said shaft to define first and second helical paths, each of said grooves of said nut body terminating at each end in a radial bore, the radial bores of one of said grooves being defined on one side of said nut body and the radial bores of the other of said grooves being defined on the opposite side of said nut body;
   a plurality of balls disposed between said nut body and said shaft, in said helical paths; and
   first and second transfer caps coupled to said sides of said nut body, each said transfer cap having a non-loaded return path defined therein which, via said radial bores, connects one end of a respective groove of said nut body to the other end of that groove, whereby two endless recirculating paths for said balls are provided, and wherein the total axial length of each endless ball path is equal to or less than the axial length of one turn of one groove.

2. An assembly according to claim 1 wherein the grooves on said shaft have the same pitch.

3. An assembly according to claim 1 wherein said grooves are spaced, in axial direction of said shaft, by a distance corresponding to half their pitch.

4. An assembly according to claim 3 wherein a transfer member is provided associated with each return bore to ensure reliable transfer of balls from the loaded grooves of said shaft and said nut to said non-loaded return bore.

5. An assembly according to claim 2 wherein a transfer member is provided associated with each return bore to ensure reliable transfer of balls from the loaded grooves of said shaft and said nut to said non-loaded return bore.

6. An assembly according to claim 1 wherein a transfer member is provided associated with each return bore to ensure reliable transfer of balls from the loaded grooves of said shaft and said nut to said non-loaded return bore.

* * * * *